(12) United States Patent
Lambert et al.

(10) Patent No.: US 10,186,740 B1
(45) Date of Patent: Jan. 22, 2019

(54) ELECTROCHEMICAL CELL HAVING A VANADIUM PHOSPHOROUS ALLOY ELECTRODE

(71) Applicant: National Technology & Engineering Solutions of Sandia LLC, Albuquerque, NM (US)

(72) Inventors: Timothy N. Lambert, Albuquerque, NM (US); Michael Hibbs, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/626,996

(22) Filed: Jun. 19, 2017

Related U.S. Application Data

(63) Continuation of application No. 13/943,566, filed on Jul. 16, 2013, now Pat. No. 9,685,684.

(60) Provisional application No. 61/672,574, filed on Jul. 17, 2012.

(51) Int. Cl.
| | |
|---|---|
| *H01M 12/06* | (2006.01) |
| *H01M 4/86* | (2006.01) |
| *H01M 8/0606* | (2016.01) |
| *H01M 4/24* | (2006.01) |
| *H01M 12/08* | (2006.01) |

(52) U.S. Cl.
CPC ......... *H01M 12/06* (2013.01); *H01M 4/8605* (2013.01); *H01M 4/242* (2013.01); *H01M 8/0606* (2013.01); *H01M 12/08* (2013.01); *H01M 2300/0082* (2013.01)

(58) Field of Classification Search
CPC .. H01M 2/1686; H01M 4/242; H01M 4/8605; H01M 8/0289; H01M 8/0606; H01M 8/186; H01M 12/06; H01M 12/08; H01M 2300/0082; H01M 2300/0094; B01D 2325/18; Y02E 60/124; Y02E 60/528
USPC ........................................................ 429/405
See application file for complete search history.

(56) References Cited

U.S. PATENT DOCUMENTS

| | | | | |
|---|---|---|---|---|
| 2007/0141456 A1* | 6/2007 | Wang | .................. | H01M 2/1686 429/144 |
| 2009/0075139 A1* | 3/2009 | Kucernak | ........... | H01M 4/8605 429/532 |

* cited by examiner

*Primary Examiner* — Gary D Harris
(74) *Attorney, Agent, or Firm* — Daniel J. Jenkins

(57) ABSTRACT

An apparatus includes an electrochemical half-cell comprising: an electrolyte, an anode; and an ionomeric barrier positioned between the electrolyte and the anode. The anode may comprise a multi-electron vanadium phosphorous. The electrochemical half-cell is configured to oxidize the vanadium and phosphorous alloy to release electrons. A method of mitigating corrosion in an electrochemical cell includes disposing an ionomeric barrier in a path of electrolyte or ion flow to an anode and mitigating anion accumulation on the surface of the anode.

12 Claims, 6 Drawing Sheets

ELECTROCHEMICAL CELL HAVING A VANADIUM PHOSPHOROUS ALLOY ELECTRODE

CROSS-REFERENCE TO RELATED APPLICATION

This application is a continuation of and claims priority to U.S. Non-Provisional patent application Ser. No. 13/943,566, entitled "Electrochemical Cell," filed Jul. 16, 2013, now allowed, which claims priority to U.S. Provisional 61/672,574, filed on Jul. 17, 2012, which is hereby incorporated by reference in its entirety.

STATEMENT OF GOVERNMENTAL INTEREST

This invention was developed under contract DE-AC04-94AL85000 between Sandia Corporation and the U.S. Department of Energy and Contract No. DE-NA0003525 between the United State Department of Energy and National Technology and Engineering Solutions of Sandia, LLC, both for the operation of the Sandia National Laboratories. The U.S. Government has certain rights in this invention.

FIELD

This disclosure relates to electrochemical cells and corrosion resistance.

BACKGROUND

A fundamental limiting factor for the majority of current battery technologies is the electron-storage mechanism, which is limited by one electron or two electron processes. Hence most batteries are intrinsically low capacity systems despite their use of low molecular weight (e.g. Li, Zn anodes) materials. The utilization of an air cathode, where the cathode "fuel" is stored outside the battery is one way in which to enhance the overall battery capacity, despite these intrinsic limitations. For example, Zn/air batteries have intrinsic and realized higher overall energy capacities than $Zn/MnO_2$ alkaline cells. However, the boundaries of this improvement are limited due to the capacity of the anode. Corrosion of the anode surface, which can also decrease capacity, is another limiting factor that is more of a problem with certain anodes.

SUMMARY

In an embodiment, an apparatus includes an electrochemical half-cell comprising: an electrolyte, an anode; and an ionomeric barrier positioned between the electrolyte and the anode.

In an embodiment, an apparatus includes an electrochemical half-cell comprising: an electrolyte, and an anode comprising an alloy of vanadium and phosphorous, such as $VP_x$, wherein x is 1-5. The electrochemical half-cell is configured to oxidize the vanadium and phosphorous alloy to release electrons.

In an embodiment, a method of mitigating corrosion in an electrochemical cell includes: disposing an ionomeric barrier in a path of ion(s) or electrolyte flow to or from an anode and mitigating anion accumulation on the surface of the anode.

The articles "a," "an," and "the" should be interpreted to mean "one or more" unless the context clearly indicates the contrary.

The term "includes" is used interchangeably with the term "comprising."

DETAILED DESCRIPTION

Figure 1:
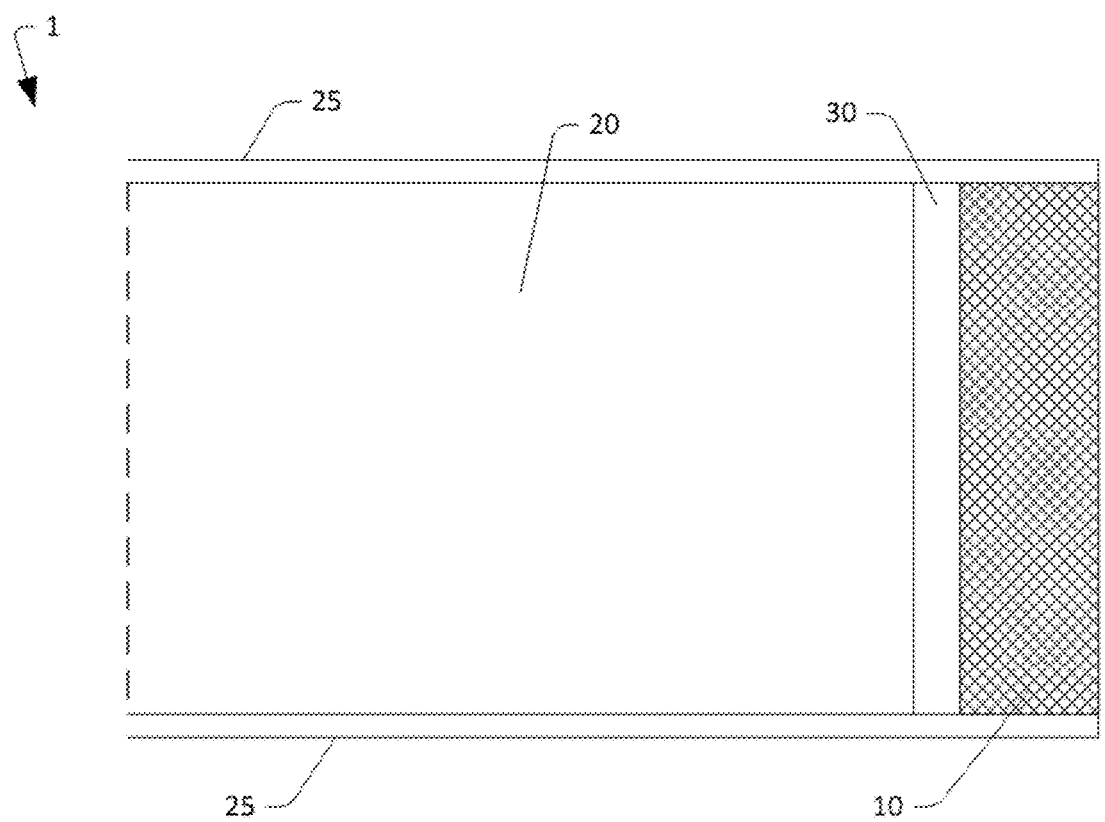
FIG. 1 is a cross-section of an embodiment of an electrochemical half-cell.

In an embodiment disclosed herein, a vanadium and phosphorous alloy, such as a vanadium phosphide material ($VP_x$, wherein x is 1-5) serves as a multiple electron high-capacity anode, where the vanadium and phosphorous alloy are sources of electrons.

This material is capable of storing and releasing multiple electrons per molecule. As disclosed herein, an electrochemical half-cell is configured to oxidize the vanadium and phosphorous alloy to release electrons. This stands in contrast to systems configured to merely use VP alloys as a scaffold for intercalcated Li+ ions. As demonstrated below, such vanadium phosphide anodes have estimated practical capacities higher than conventional batteries and even approximately 1.6 times higher than that of gasoline. In an embodiment, the vanadium phosphide material anode is partnered with an air cathode or used in ceramic batteries.

Corrosion on the anode surface is a challenge in electrochemical cells using metallic or ceramic anodes in aqueous systems. Corrosion may be especially rapid in systems with multi-electron electrodes, as was found in the vanadium phosphide electrochemical half-cells disclosed herein. While coating the anode with $ZrO_2$ has been used in some electrochemical cells to reduce corrosion, that method is not always sufficient or effective at all as shown below. Accordingly, a new apparatus and method for mitigating corrosion is disclosed herein as well.

In an embodiment, the electrochemical half-cell includes an electrode and an electrolyte. The anode comprises a vanadium and phosphorous alloy, such as $VP_x$, wherein x is 1-5, such as 2-4, or 3-5. The higher the value of x, the more electrons per molecule are available for storage and releasing.

The $VP_x$ material may be a mixture of analogs, i.e., the material may be a mixture of VP, $VP_2$, $VP_3$, $VP_4$, and $VP_5$. In an embodiment, a VP and $VP_4$ mixture is formed, comprising a ratio in a range of 10-60:40-90, such as 20-50:50-20, or 35-45:55-65. An average stoichiometry for the $VP_x$ mixture may range from $VP_1$ to $VP_5$, such as $VP_{1.5}$ to $VP_{4.5}$, or $VP_2$ to $VP_3$. In an embodiment, at least 50% of the $VP_x$ is $VP_{2-5}$.

In an embodiment, other materials may be included in the $VP_x$ anode. Such as, for example, conductive carbon materials, binders, adhesion promoters, electrically conductive diluents.

In an embodiment, the $VP_x$ material is in a nanoparticle form with a spherical morphology, wherein the number-average diameter of the particles is 40 to 500 nm, such as 50 to 200 nm, or 75 to 125 nm. A BET surface area of the nanoparticles may range, for example, from 5 to 100 $m^2/g$, such as 7.5 to 40 $m^2/g$, or 8 to 25 $m^2/g$.

The theoretical gravimetric (and volumetric) capacities for VP, $VP_2$ and $VP_4$ are calculated to be 3271 mAh $g^{-1}$ (16.4 kAh $L^{-1}$), 3561 mAh $g^{-1}$ (16.2 kAh $L^{-1}$) and 3832 mAh $g^{-1}$ (14.0 kAh $L^{-1}$), based on the 10, 15, and 25 electron discharge reactions shown in Equations 1-3, respectively. These theoretical gravimetric (and volumetric) capacities are 3.2 (2.8), 4.3 (2.8) and 4.7 (2.4) times higher than that for Zinc at 820 mAh $g^{-1}$ (5.8 kAh $L^{-1}$).

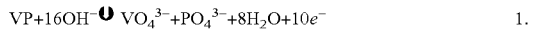
$$VP + 16OH^- \leftrightarrow VO_4^{3-} + PO_4^{3-} + 8H_2O + 10e^- \quad \quad 1.$$

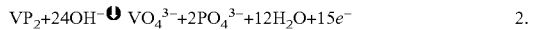
$$VP_2 + 24OH^- \leftrightarrow VO_4^{3-} + 2PO_4^{3-} + 12H_2O + 15e^- \quad \quad 2.$$

$$VP_4 + 40OH^- \leftrightarrow VO_4^{3-} + 4PO_4^{3-} + 20H_2O + 25e^- \quad \quad 3.$$

While there is limited thermodynamic data available for $VP_x$,[9] a theoretical cell voltage for VP (1.47 V vs. NHE) can be estimated by coupling Equation 1 with the half-cell oxygen reduction reaction for an air cathode (Equation 4) to give a VP/air full cell reaction as shown in Equation 5 (ESI†). Assuming an 18% efficiency for a VP/air cell gives an estimated lower limit practical cell capacity of 16.3 kAh $L^{-1} \times 1.47$ V $\times 0.18 = 4.3$ kWhL$^{-1}$: a volumetric capacity that is approximately 1.6 times that of gasoline (2.7 kWhL$^{-1}$).

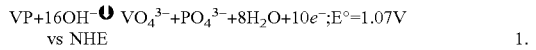
$$VP + 16OH^- \leftrightarrow VO_4^{3-} + PO_4^{3-} + 8H_2O + 10e^-; E°=1.07V \text{ vs NHE} \quad 1.$$

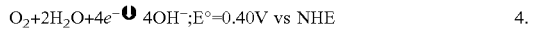
$$O_2 + 2H_2O + 4e^- \leftrightarrow 4OH^-; E°=0.40V \text{ vs NHE} \quad 4.$$

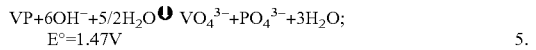
$$VP + 6OH^- + 5/2H_2O \leftrightarrow VO_4^{3-} + PO_4^{3-} + 3H_2O; E°=1.47V \quad 5.$$

In an embodiment, the $VP_x$ material is used in an electrochemical cell with a gravimetric capacity of 1800 to 3800 mAh $g^{-1}$, such as 2500 to 3200, or 2400 to 3000. In an embodiment, the $VP_x$ material is used in an electrochemical cell with a voltage (vs. NHE) of 1.0 V to 1.5 V, such as 1.25 to 1.45 V, or 1.3 to 1.4 V. In an embodiment, the $VP_x$ material is used in a 4 to 8 kWhL$^{-1}$ capacity electrochemical cell, such as a 4.1 to 6 kWhL$^{-1}$ battery, or a 4.2 to 5 kWhL$^{-1}$ electrochemical cell. Actual efficiencies as a percentage of theoretical gravimetric or volumetric capacities may vary, for example from 18% to 60%. Depending on the electrolyte and cathode, the rate of discharge of such cells may be at, for example, a 10 to 1000 mA $g^{-1}$, a 25 to 500 mA $g^{-1}$, or a 50 to 100 mA $g^{-1}$ rate.

In an embodiment, the electrolyte may be a solid or a liquid. Examples include aqueous solutions of metal salts that dissociate to form ions, such as sodium, potassium, calcium, magnesium, chloride, fluoride, hydroxide, hydrogen phosphate, and hydrogen carbonate. Other examples include polyelectrolytes and other substances that react with water to produce ions, such as $CO_2$. Further example electrolytes include: ethylene carbonate, diethyl carbonate, propylene carbonate, and combinations thereof or combined with lithium or ammonium salts. Further examples include, tetralithium electrolyte salts, such as $LiPF_6$, $LiBF_4$, and $LiClO_4$, or their tetraalkylammonium analogs. In an embodiment, aqueous solution, gel, dry polymer, or ceramic electrolyte forms may be used.

In an embodiment, the electrolyte has an electrolyte conductivity of, for example, 100 to 1000 mS/cm, such as about 150 to 300 mS/cm or 400 to 700 mS/cm.

In an embodiment, the pH of the electrolyte, such as an aqueous electrolyte solution is typically basic, but may range from 3 to 10 for example, 7 to 9, or 7.5 to 8.5.

In an embodiment, the vanadium and phosphorous alloy material is produced by the process of ball milling vanadium and phosphorous. This process may be achieved with little or no applied heating. For example, in an embodiment, no heating other than the heat from the milling reaction is supplied to the system. In an embodiment, the temperature of the reaction is less than 600° C., such as 50° to 500° C., or 25° to 100° C. In an embodiment, the temperature in the mill is kept below 100° C. After sufficient milling, for example, at 1000 rpms, for 96-60 minute cycles, with 10 minute resting intervals, the reaction product is removed and sieved from the balls. Milling rpms, time per cycle, and number of cycles may be adjusted accordingly to be sufficient for the low temperature reaction, such as by varying each variable by up to 25%.

In an embodiment, an electrochemical half-cell includes an electrolyte, an anode, and an ionomeric barrier positioned between the electrolyte and the anode, in a path of electrolyte/ion flow to the anode. In this embodiment, the anode is not necessarily a $VP_x$ material. Corrosion on the anode is mitigated by the use of an ionomeric barrier as an anion exchange membrane (AEM). The ionomeric barrier allows for improved capacities. For example, the ionomeric barrier may be used with a $VP_x$ anode to achieve 78% of theoretical values for capacity.

Corrosion reactions are typically accelerated above a certain critical (e.g. hydroxide) concentration (see X. G. Zhang, *Corrosion and Electrochemistry of Zinc*, Plenum Press, New York, 1st Ed. 1996, Ch. 14, p. 380). Without being bound by theory, it is proposed that the ionomeric barrier results in a lower hydroxide concentration at the anode surface with significantly decreased rates of corrosion, while still allowing for discharge to occur at desired rates. At least in a similar zinc system, it is known that higher hydroxide concentrations also lead to enhanced corrosion product dissolution, which further increases corrosion. Hence, without being bound by theory, an additional explanation for reduced corrosion could be that the ionomeric barrier also limits diffusion of the corrosion products from the anode surface, which inhibits the surface corrosion.

The polymeric AEM is an ionomer that is capable of shuttling/transferring a charge from one side to the other. The polymer base for the ionomeric barrier may be selected based, at least in part, on high chemical stability in alkaline electrolyte and high hydroxide conductivity. Example base polymers include poly(phenylene), poly(sulfone), poly(ethylene), poly(arylene ether), poly(ether ether ketone), poly (styrene), or polymers with perfluorinated backbones, such as the one used in NAFION. In an embodiment, the ionomer comprises a cationic functional group, such as a quaternary ammonium cation, phosphonium, sulfonium, complexed metal cations, and resonance-stabilized cations (pyridinium, imidazolium, guanidinium). A quaternary ammonium cationic functional group may be selected from tetraalkyl-substituted nitrogen species, such as benzyltrimethyl ammonium and alkyltrimethyl ammonium. Specific examples include poly(phenylene) with pendant benzyltrimethyl ammonium hydroxide groups, and membranes described in U.S. Pat. No. 7,888,397 and in Hibbs, M. R., et al. (2009), *Synthesis and Characterization of Poly(phenylene)-Based Anion Exchange Membranes for Alkaline Fuel Cells*, Macromolecules, 2009, 42 (21), pp 8316-8321 (doi: 10.1021/ma901538c) (both of which are incorporated herein by reference), such as ATMPP (aminated tetramethylpoly(phenylene). Further examples of the ionomer are membranes described in Hibbs, M. R. (2012), *Alkaline stability of poly(phenylene)-based anion exchange membranes with various cations*. J. Polym. Sci. B Polym. Phys. (doi: 10.1002/polb.23149), also incorporated by reference herein, such as TMAC6PP, which comprises mer units of the formula shown below.

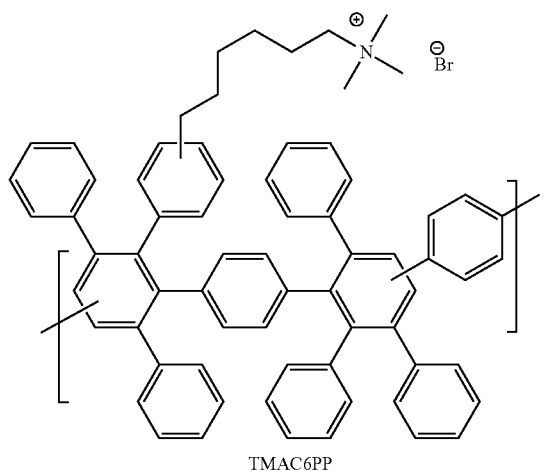

TMAC6PP

In an embodiment, the ionomer comprises up to 25 molar % of repeat units with a charged functional group, for example, 1 to 15%, or 3 to 10%.

In an embodiment, the ionomer has a number average molecular weight of 50,000 to 150,000, such as 60,000 to 120,000, or 75,000 to 110,000. The polydispersity may range, for example, from 1.8 to 3.5, such as 2.0 to 3.0, or 2.2 to 2.8. In an embodiment, the hydroxide ion conductivity in water at room temperature may range as high as 100 mS cm$^{-1}$, such as 20 to 70 mS cm$^{-1}$, or 40 to 60 mS cm$^{-1}$. In an embodiment, the ion exchange capacity of the ionomeric barrier is 0.5 to 5 mEq g$^{-1}$, such as 1.5 to 2.5 mEq g$^{-1}$, or 1.75 to 2.25 mEq g$^{-1}$, and the water uptake (hydroxide form) is 50% to 175%, such as 65% to 150%, or 75% to 125%.

In an embodiment shown in FIG. 1, an electrochemical half-cell 1, includes an anode 10. An electrolyte 20 is also present and is contained within a housing 25. Electrical current in the form of charged species, such as OFF ions, flows from the electrolyte 20 to the anode 10. An ionomeric barrier 30 is positioned between the electrolyte 20 and the anode 10, in the path of electron flow to the anode 10 from the electrolyte 20.

In an embodiment, the ionomeric barrier 30 completely obstructs the electrolyte 20 from contacting the anode 10. This may be accomplished by matching the dimensions of the ionomeric barrier 30 to the anode 10 and the surrounding housing 25. The ionomeric barrier 30 may be physically coupled, such as directly connected, to the anode 10, thereby sealing the anode 10 from the electrolyte 20.

In an embodiment, the ionomeric barrier 30 may have a thickness, (thickness being in the dimension separating the anode from the electrolyte) of 0.001 mm to 1 mm, such as, for example, 0.05 mm to 0.5 mm, or 0.1 mm to 0.9 mm.

In this embodiment, the anode is not necessarily VP$_x$, but more generally may comprise a material that is subject to oxidative corrosion, such as a species that will undergo a side reaction with hydroxide. Examples include carbon, metals such as vanadium, lithium, zinc, iron, nickel, tin, copper, aluminum, chromium, indium, steel, brass, alloys of metals, such as those discussed above with other metals or with species such as oxides, borides, phosphides, selenides, silicides and carbides, may also be used. Specific examples of multi-electron producing anodes include alloys of V and P, VP$_{1-5}$, Sn$_4$P$_3$, metal borides, such as VB, VB$_2$, TiB$_2$, ZrB$_2$, TaB, TaB$_2$, MgB$_2$, CrB, CrB$_2$, CoB, NiB, MoB, TiB, TiB$_2$, and LaB$_6$.

In an embodiment, the electrochemical half-cell 1 may be paired with an air cathode, a conventional transition metal cathode, or a lithium/transition metal/oxide or phosphate cathode. In such an embodiment, the apparatus may further comprise a separator, the separator positioned between the anode 10 and the cathode. In such a case, the ionomeric barrier 30 is also positioned on the anode side of the separator.

In an embodiment, a method of controlling corrosion in an electrochemical cell includes disposing an ionomeric barrier in a path of electrolyte/ion flow to an anode and mitigating hydroxide accumulation on the surface of the anode. Mitigating hydroxide accumulation means reducing the amount that would be present on the surface of the anode without the ionomeric barrier, such as a reduction of 50% or more, 5% to 85%, or 25% to 50%.

In an embodiment, the corrosion is controlled by varying the thickness of the ionomeric barrier, such as from 0.001 mm to 1 mm, as disclosed above. The corrosion may also be controlled by varying a total ionomeric charge of the ionomeric barrier, such as by adjusting the number of functionalized repeat units in the ionomer, the type of functional group used, the ion exchange capacity, or the water uptake percent. The corrosion may also be controlled by varying a surface area of the anode that is covered by the ionomeric barrier. A capacity and discharge rate may also be affected by these variations to control corrosion.

By controlling the rate of corrosion with the ionomeric barrier, anode materials that suffer from rapid corrosion become more useable with a higher capacity. The ionomeric barrier method disclosed herein enhances the utility of anode materials such as VP$_x$ that are highly susceptible to corrosion. The ionomeric barrier is particularly useful for anode materials that are not substantially affected by ZrO$_2$ coatings.

A section including working examples follows, but as with the rest of the detailed description, should not be read to be limiting on the scope of the claims.

EXAMPLES

Example 1

In Example 1, alloyed vanadium phosphides (VP$_x$) (nanoparticles) were synthesized by mechano-chemical synthesis using a ball mill (Fritsch Pulverisette 7 Mill). Vanadium powder (325 mesh powder, 99.5% metal basis, Aldrich) (2.0 g, 0.039 mol, 1 equivalent) and red phosphorous powder, (99% metal basis, Aldrich) (4.86 g, 0.157 mol, 4 equivalents) were added to each of the two bowls (Hard Metal Tungsten Carbide grinding bowls, 80 mL capacity) in an argon filled glove-box. 1.6 mm tungsten carbide balls (6.86 g) were then added to each of the grinding bowls and the lids were secured and locked in place. The bowls were removed from the glove-box and inserted into the ball mill. The ball mill was run at 1000 rpm for 96 cycles with each cycle consisting of 60 minutes with 10 minute resting intervals. The temperature was monitored using an IR gun to ensure the external temperature of the bowls did not rise above 100° C. Periodically the reaction was paused and the surface fittings all tested for tightness. Upon completion of the reaction, the powder was isolated from the balls by sieving and analyzed by XRD and BET.

Examples 2-4

In Examples 2-4 the materials of Example 1 were characterized.

Figure 2:
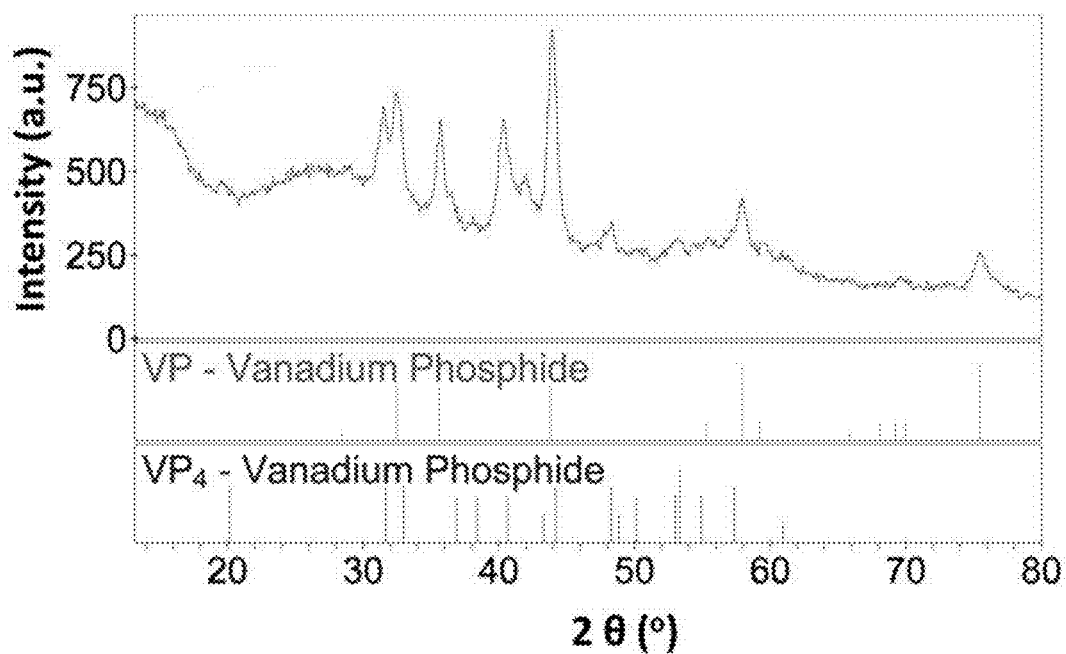
FIG. 2 is a PXRD spectrum of the $VP_x$ material of Example 1.

Powder X-ray Diffraction (PXRD) was used in Example 2 to characterize the material. $VP_x$ powder of Example 1 was placed onto a zero background holder purchased from The Gem Dugout, State College, Pa. 16803. Samples were scanned at a rate of 0.024°/15 s in the 2θ range of 10-80° on a Bruker D8 Advance diffractometer in Bragg-Brentano geometry with Cu Kα radiation and a diffracted beam graphite monochromator. Phase identification was determined from the PXRD patterns using Jade 9 software suite. The PXRD spectrum is shown in FIG. 2. $VP_4$, and VP indexes are shown.

Figure 3:
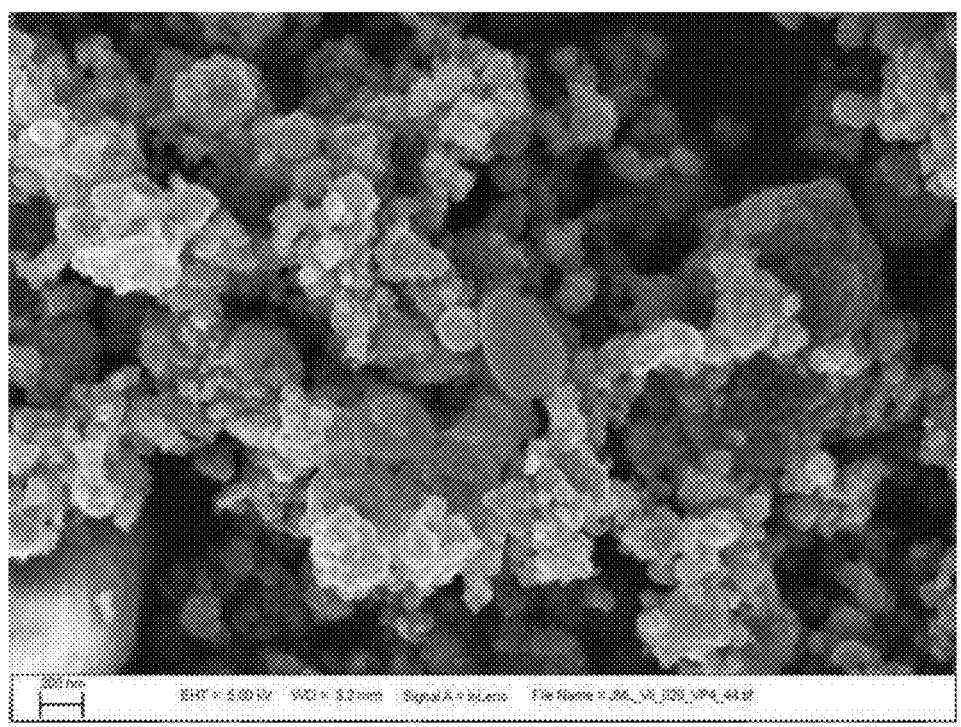
FIG. 3 is an SEM photograph of the $VP_x$ material of Example 1.

In Example 3, Scanning Electron Microscopy (SEM) was used to characterize the material of Example 1. $VP_x$ powder was dispersed onto carbon tape from TEDPELLA and imaged using a Zeiss Supra 55VP field emitter gun scanning electron microscope (FEGSEM). The $VP_x$ material was roughly spherical in morphology and ranged in size from 50 to 200 nm, with some larger (approximately 500 nm) sized pieces observed as well by SEM, as shown in FIG. 3.

Figure 4:
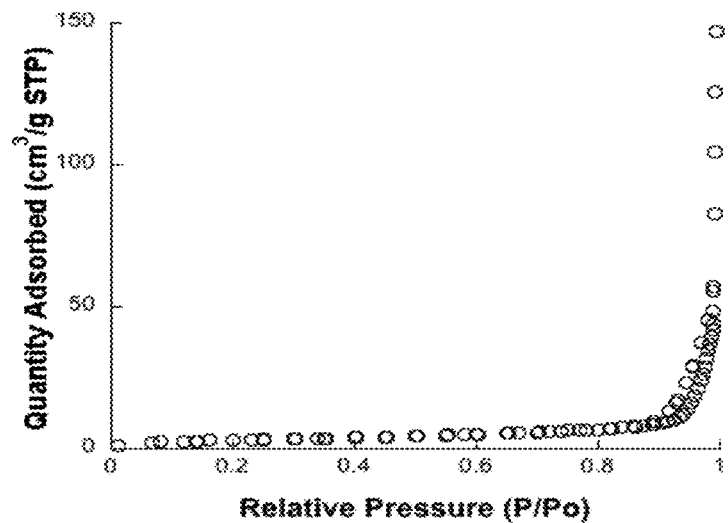
FIG. 4 is nitrogen sorption isotherm data for the $VP_x$ material of Example 1.

In Example 4, Brunauer-Emmett-Teller (BET) surface area analysis was performed on Example 1. $N_2$ adsorption/desorption on composite samples was measured using a MICROMETRICS TRISTAR 3000 sorptometer. A BET value of 11.6 $m^2$/g was obtained. The nitrogen sorption isotherm data is shown in FIG. 4.

Example 5

Electrodes were prepared by drop-casting an aliquot of $VP_x$ ink (200 μL) onto a nickel disc (diameter=⅝", 8 mm thickness) via micropipette and allowed to dry at room temperature for approximately 4 to 6 hours. Aliquots were taken from a homogeneously dispersed ink prepared as follows: 90.0 mg of $VP_x$ and 10.0 mg of SAB Carbon were mixed with 2.4 mL 5% NAFION and 1.6 mL isopropanol. The mixture was sonicated (bath sonicator) at room temperature for a minimum of 1 hour.

Example 6-9

For electrochemical testing, the electrodes were placed in a PTFE holder exposing 1 $cm^2$ of surface to the electrolyte solution. The electrodes were discharged galvanostatically in one of two formats: (Format 1—Examples 6 and 7) A three-electrode format: with $VP_x$ as the working electrode with platinum foil (~2.5 $cm^2$) and Hg/HgO (0.1M KOH) serving as the counter and reference electrodes, respectively. (Format 2—Examples 8 and 9) A two-electrode format: with ELECTRIC FUELS E4 air cathode (approximately 1 $cm^2$) as the working electrode and the $VP_x$ (reference shorted) as the counter. Supporting electrolyte was either aqueous 30% KOH (Examples 6 and 8) or 2 M $K_2CO_3$ (Examples 7 and 9).

Example 10

Galvanic discharges were performed on either a PAR 273 or SOLATRON 1287 potentiostat controlled with CORRWARE software from SCRIBNER ASSOCIATES. In all cases, discharge capacities are reported for discharge to 0 V. Table 1 below provides additional information on these examples.

Corrosion of the $VP_x$ electrodes was instantly noticeable when submerged in the electrolyte. Visible gas generation on the electrode surface occurred even prior to discharge, indicating a chemical corrosion. Without being bound by theory it is believed the corrosion reaction proceeds (as shown for $VP_4$ as an example) as follows:

$$VP_4 + 5H_2O + 15OH^- \rightarrow VO_4^{3-} + 4PO_4^{3-} + 25/2 H_2 \qquad 6.$$

Example 11

Despite the corrosion, capacities of ~1100 mAh $g^{-1}$ were obtained when the $VP_x$ electrode was discharged to 0 V (Examples 6 and 7) at 100 mA $g^{-1}$ discharge rates.

Figure 5:
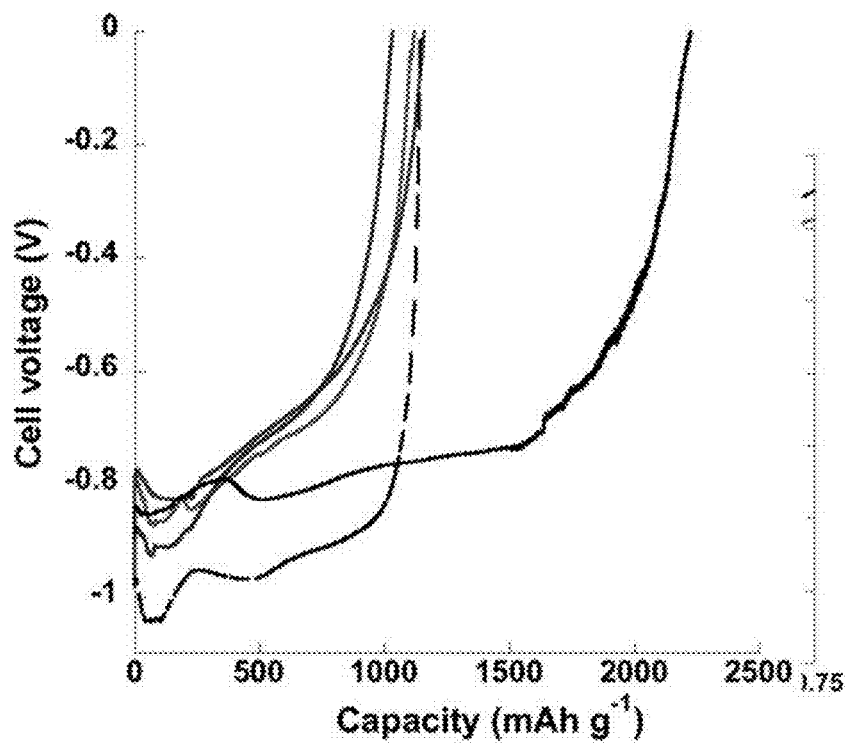
FIG. 5 is a graph of discharge capacities for the Example 6 $VP_x$ anode at 100 mA $g^{-1}$ (first three lines to the left) and 50 mA $g^{-1}$ (dotted black line), and of the Example 21 AEM:$VP_x$ anode (line extending furthest to the right).

FIG. 5 shows a graph of discharge capacities for Example 6 (30% KOH electrolyte) at 100 mA $g^{-1}$ (first three lines to the left) and 50 mA $g^{-1}$ (dotted black line). (Triplicate runs at 100 mA $g^{-1}$ were performed to verify that the drop casting method for electrode preparation gave fairly uniform films). Voltage plateaus were weak and averaged to approximately −0.75 V. In FIG. 5, slower 50 mA $g^{-1}$ discharge rates gave more negative voltage plateaus at approximately −0.95 V, but similar values of capacity (1046 mAh $g^{-1}$) were still observed. The relatively non-flat voltage plateaus and no obtained increase in capacity at the slower discharge rate can partially be attributed to the $VP_x$ surface corrosion reaction, leading to losses in electrochemical potential. (In FIG. 5, discharge of AEM:$VP_x$ at 50 mA $g^{-1}$ is shown as the solid black line extending furthest to the right. This is discussed below in Examples 21-23.)

Figure 6:
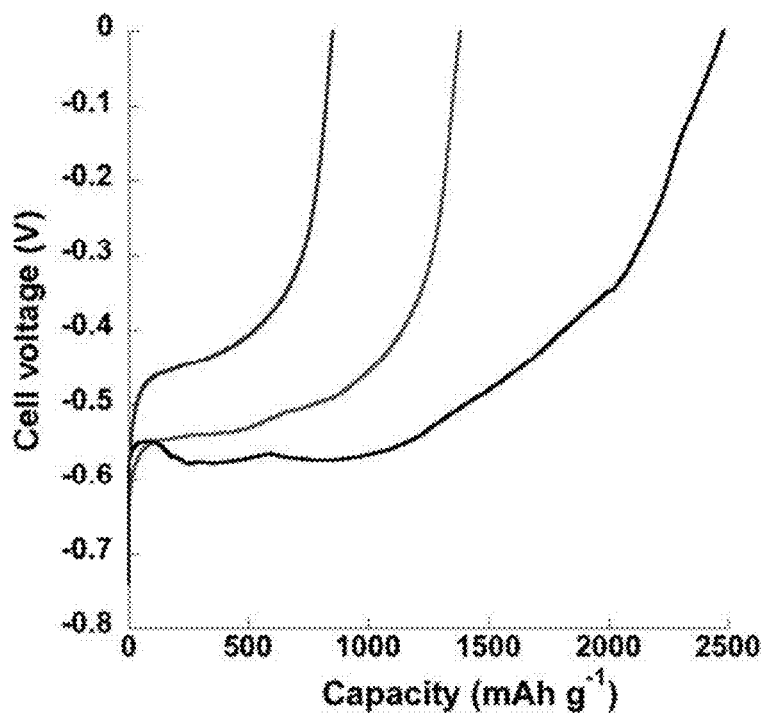
FIG. 6 is a graph of discharge capacities for the Example 7 $VP_x$ anode at 100 mA $g^{-1}$ (first line to the left) and 50 mA $g^{-1}$ (middle line), and of the Example 22 AEM:$VP_x$ anode (line extending furthest to the right).

FIG. 6 shows a graph of discharge capacities for Example 7 (2 M $K_2CO_3$ electrolyte) at 50 mA $g^{-1}$ (middle line) and 100 mA $g^{-1}$ (first line to the left). Capacities of approximately 853 mAh $g^{-1}$ and 1383 mAh $g^{-1}$, respectively were observed. The slightly higher capacity obtained in 2 M $K_2CO_3$ at 50 mA $g^{-1}$ is partially attributed to the lower corrosion rate of $VP_x$ in this electrolyte. The lower capacity obtained in 2 M $K_2CO_3$ at 100 mA/g is likely due to its lower electrolyte conductivity (e.g. 223 mS/cm @ 2.14 M); as compared to 30% KOH (e.g. 529 mS/cm @ 23% by wt.). (In FIG. 6, discharge of AEM: $VP_x$ at 50 mA $g^{-1}$ is shown as solid black line, this is discussed below in Examples 21-23.)

Example 12

Figure 7:
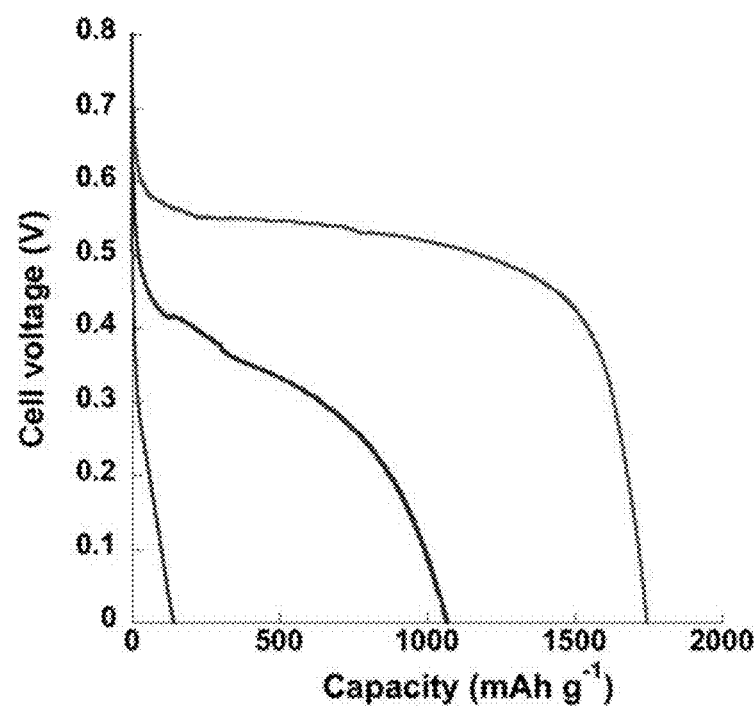
FIG. 7 is a graph of discharge capacities for the Example 9 $VP_x$ anode at discharge rates of 50 mA $g^{-1}$ (third line from left), 100 mA $g^{-1}$ (middle line), and 200 mA $g^{-1}$ (first line from left).

To demonstrate that this class of materials could potentially serve as a high capacity anode in ceramic/air batteries, the $VP_x$ electrodes of Example 8 (air cathode, 30% KOH) and Example 9 (air cathode, 2 M $K_2CO_3$) were also discharged to 0 V. FIG. 7 shows that for the Example 9 $VP_x$ system, approximately 1744 mAh $g^{-1}$, 1069 mAh $g^{-1}$ and 144 mAh $g^{-1}$ capacities were obtained at discharge rates of 50 mA $g^{-1}$ (third line from left), 100 mA $g^{-1}$ (middle line), and 200 mA $g^{-1}$ (first line from left). Voltage plateaus for the 50 mA $g^{-1}$ discharge were approximately 0.55 V.

Figure 8:
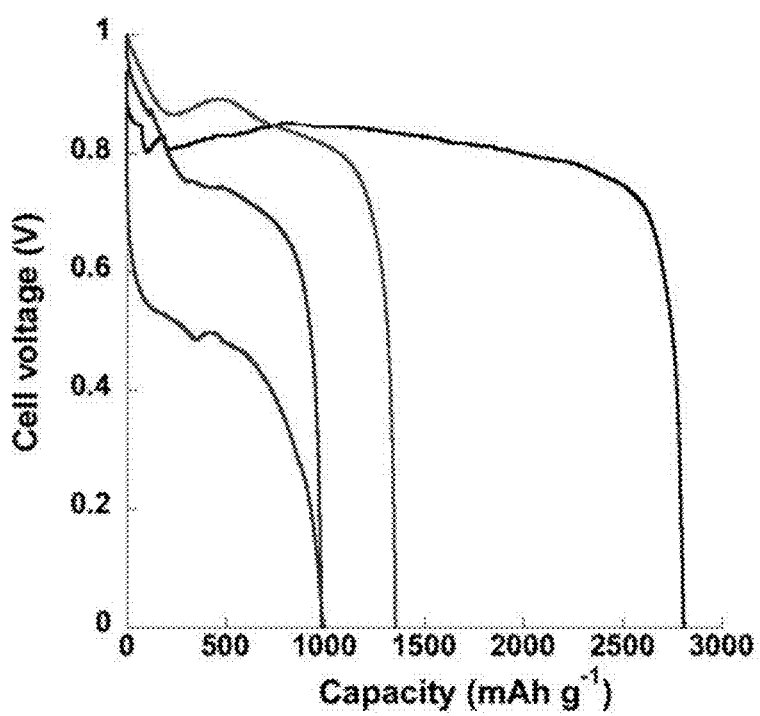
FIG. 8 is a graph of discharge capacities for the Example 8 $VP_x$ anode at discharge rates of 50 mA $g^{-1}$ (third line from left), 100 mA $g^{-1}$ (second line from left), and 200 mA $g^{-1}$ (first line from left), and of the Example 23 AEM:$VP_x$ anode (line extending furthest to the right).

Compared to Example 9, discharges of Example 8 (in 30% KOH) generally provided for higher voltage and allowed for much faster discharge rates. FIG. 8 shows the capacities obtained were 1355 mAh $g^{-1}$, 982 mAh $g^{-1}$, and 990 mAh $g^{-1}$ at 50 mA $g^{-1}$, 100 mA $g^{-1}$ and 500 mA $g^{-1}$ rates, respectively. These values demonstrate that $VP_x$ could also serve as high power electrodes in 30% KOH electrolyte. The obtained capacities here are considerably higher than the theoretical capacity for Zn anode (820 mAh $g^{-1}$) in a Zn/air cell, they are lower than reported values for $VB_2$ and those experimentally determined (e.g. $VB_2$ 3300 mAh $g^{-1}$ at 100 mA $g^{-1}$). Again, this can partially be attributed to the competing chemical corrosion reactions. (In FIG. 8, discharge of AEM: $VP_x$ at 50 mA $g^{-1}$ is shown as solid black line, this is discussed below in Examples 21-23.)

Examples 13-18

In order to improve the discharge capacities, methods to prevent the competing chemical corrosion reaction of the $VP_x$ anode surface were desired. $ZrO_2$ coatings on $VB_2$ (referred to here as $ZrO_2$:$VB_2$), and other electrode surfaces, has been offered as one method to improve electrode performance by acting as a hydroxide shuttle/barrier layer.

In Examples 13 to 16, $VP_x$ electrodes were prepared as above. In Examples 14 and 16, the method disclosed in S. Licht, H. Wu, X. Yu and Y. Wang, *Chemical Communications*, 2008, 3257-3259, incorporated herein by reference, was used to coat the $VP_x$ electrodes of Example 5 with $ZrO_2$ (5% by weight coating (theoretical value)).

As a comparison, nanoparticle $VB_2$ electrodes were prepared in Examples 17 and 18. The $VB_2$ electrodes were prepared via a two-step ball milling procedure utilizing a Fritsch Pulverisette 7 Mill equipped with 2 tungsten carbide cups (20 mL capacity). Each cup was initially loaded with approximately 10.3 g of tungsten carbide milling media (3 mm diameter), approximately 10.3 g of commercial $VB_2$ powder, and 5 mL toluene. Milling proceeded at 1000 rpm for 42 cycles, with each cycle consisting of 10 minutes of milling followed by 30 minutes of cooling. The processed powder was separated from the milling media via dry sift through a mesh sieve. For the second milling step, the previously processed $VB_2$ powder (approximately 9 g in each tungsten carbide cup) was combined with 9 g of 0.6 mm diameter tungsten carbide milling media and 5 mL of toluene. Milling was carried out at 1000 rpm for 34 cycles, with each cycle consisting of 10 minutes of milling followed by 25 minutes of cooling. Powders were separated from milling media via dry sift through a mesh sieve. Electrodes were then formed from the powder by the ink drop-casting technique disclosed above.

In Example 18, a $ZrO_2$ coating (5%) was applied to the $VB_2$ electrode per the same procedure used for the $VP_x$ electrodes.

Corrosion measurements were performed on either a VOLTALAB 40 or VOLTALAB 10 potentiostat (Radiometer Analytical), controlled by the VOLTAMASTER software. Samples were held in a PTFE holder, exposing 1 $cm^2$ area to the solution, with a Pt counter electrode and Hg/HgO (0.1 M KOH) electrode. Samples were typically immersed in the electrolyte (30% KOH or 2M $K_2CO_3$) for approximately 1-2 hours to equilibrate prior to measurements. A minimum of three independent samples were used for each material of interest. Potentiodynamic polarization measurements were performed at 0.2 mV/s. Polarization resistance, corrosion current and Tafel slopes were all determined by fitting with the VOLTAMASTER software. Electrochemical impedance spectroscopy (EIS) measurements were run at open circuit potential from 100 kHz to 10 mHz, with a 5 mV signal. Polarization resistances were determined by fitting this data to a circuit model using ZVIEW software (Scribner Associates).

TABLE 1

Corrosion Summary for $VP_4$ Electrodes[a]

| Example | Material | Electrolyte | Average $R_p$ from EIS (kΩ) | Average $R_p$ from Tafel (kΩ) | Average corrosion current ($\mu A\ cm^{-2}$) from Tafel |
|---|---|---|---|---|---|
| 13 | $VP_x$ | 30% KOH | 0.57(0.19) | 0.64(0.18) | 42.0(9.3) |
| 14 | $ZrO_2$:$VP_x$ | 30% KOH | 0.52(0.16) | 0.58(0.18) | 47.1(15.2) |
| 15 | $VP_x$ | 2M $K_2CO_3$ | 1.90(1.52) | 1.50(0.53) | 16.4(5.0) |
| 16 | $ZrO_2$:$VP_x$ | 2M $K_2CO_3$ | 1.44(0.72) | 1.60(0.77) | 16.0(8.9) |

[a]Values in parentheses are standard deviations: Assumes 19 e- for $VP_{28}$ average composition (60% $VP_4$ and 40% VP)

As shown in Table 1, Tafel measurements gave average corrosion values of 42 mA $cm^{-2}$ for $VP_x$ in 30% KOH. $VP_x$ corrosion studies conducted in 2 M $K_2CO_3$ yielded a corrosion current of 16.4 mA $cm^{-2}$, which is less than half of that obtained in 30% KOH.

TABLE 2

Corrosion Summary for $VP_2$ electrodes[a]

| Example | Material | Electrolyte | Average $R_p$ from EIS (kΩ) | Average $R_p$ from Tafel (kΩ) | Average corrosion current ($\mu A\ cm^{-2}$) from Tafel |
|---|---|---|---|---|---|
| 17 | Nano $VB_2$ | 30% KOH | 0.94(0.27) | 0.93(0.10) | 25.1(2.8) |
| 18 | $ZrO_2$:$VP_2$ | 30% KOH | 1.70(1.03) | 3.51(2.65) | 10.7(7.6) |

[a]Values in parentheses are standard deviations

As shown in Tables 1 and 2, the $ZrO_2$ coating method was useful in lowering the average corrosion currents for $VB_2$ from 25.1 $\mu A\ cm^{-2}$ ($VB_2$) to 10.7 $\mu A\ cm^{-2}$ ($ZrO_2$:$VB_2$); however, it was found to be ineffective when used analogously with $VP_x$. Obtained corrosion currents were very similar at 42 $\mu A\ cm^{-2}$ ($VP_x$) and 47.1 $\mu A\ cm^{-2}$ ($ZrO_2$:$VP_x$) in 30% KOH and 16.4 $\mu A\ cm^{-2}$ ($VP_x$) and 16.0 $\mu A\ cm^{-2}$ ($ZrO_2$:$VP_x$) in 2 M $K_2CO_3$. Notably, submersion of $ZrO_2$:$VP_x$ in 30% KOH still gave visible gas generation on the electrode surface, suggestive of incomplete coverage with $ZrO_2$, consistent with the high rate of corrosion.

Examples 19 and 20

Anion exchange membranes (AEMs) based on a poly(phenylene) backbone, specifically aminated tetramethylpoly(phenylene) (ATMPP) were prepared by a Diels-Alder reaction as previously described in M. R. Hibbs, C. H. Fujimoto and C. J. Cornelius, *Macromolecules*, 2009, 42, 8316-8321 (incorporated herein by reference) were obtained. Data for polymers used in this study are presented in Table 3. Examples 19 and 20 correspond to structure I, have n repeat units, and were made from homo-polymers with the ionic groups randomly distributed among the n repeat units. While structure I is simplified to show two benzyltrimethyl ammonium groups on each repeat unit, Examples 19 and 20 were determined to have an average of 2.20 and 2.22 cationic groups per repeat unit, respectively.

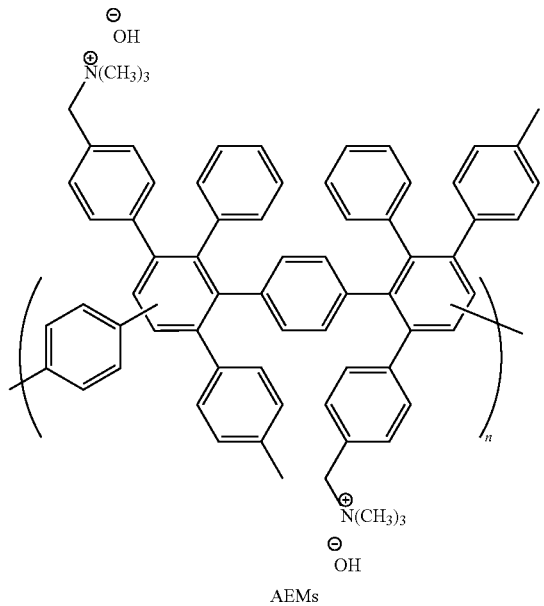

AEMs

I.

TABLE 3

Properties for Anion Exchange Membranes (AEMs).[a]

| Membrane | Thickness (μm) | Measured IEC (mEq g$^{-1}$) | Conductivity (mS/cm) | Water uptake (%) |
|---|---|---|---|---|
| Example 19 | 90 | 2.25 | 44 | 114 |
| Example 20 | 90 | 2.31 | 45 | 118 |

[a]Measurements were made with the polymers in hydroside form. The thickness is for hydrated membranes. Conductivities were measured in water at room temperature.

Examples 21-23

In Examples 21 and 22, AEM covered VP$_x$ electrodes were constructed from the materials disclosed above. The AEMs were cut into ⅝ in. diameter disks and placed between the VP$_x$ and the bulk electrolytes (30% KOH—Example 21, 2M K$_2$CO$_3$—Example 22), using the same PTFE holder and Pt counter electrode system as above. This anode assembly (termed here as AEM:VP$_x$) provided for much higher discharge capacities than the VP$_x$ anode assemblies of Examples 6-9, as reported in Example 11 and FIGS. 5, 6, and 8.

For example, in Example 21, an approximately two-fold increase in capacity (2227 mAh g$^{-1}$) and a prolonged voltage plateau were obtained when AEM:VP$_x$ was discharged against a Pt counter in the 30% KOH at a 100 mA g$^{-1}$ rate, see FIG. 5 (line extending furthest to the right). Example 21 is shown in FIG. 5 as the solid line extending furthest to the right. In Example 22 a similar increase in capacity (to 2480 mAh g$^{-1}$) and sustained voltage plateau were also observed for AEM:VP$_x$ in K$_2$CO$_3$ at 50 mA g$^{-1}$ rate. Example 22 is shown in FIG. 6 as the solid line extending furthest to the right.

In Example 23, AEM:VP$_x$ as used in Examples 21 and 22 was discharged versus the Electric Fuels™ E4 cathode in 30% KOH electrolyte. This corresponds to Example 8 above, which was not shielded with an AEM. With minimal optimization of the AEM:VP$_x$ electrode assembly (careful "flat" placement of the AEM on the VP$_4$ surface), a highest capacity of 2800 mAh g$^{-1}$ was observed. After a slight break in period, a relatively stable discharge voltage plateau (approximately 0.8 V) was also obtained. Example 23 is shown in FIG. 8 as the solid line extending furthest from the left. This is approximately 78% of the expected average capacity of 3608 mAh g$^{-1}$ for the VP$_x$ prepared here.

Unfortunately, corrosion measurements on the AEM:VP$_x$ electrodes proved problematic and could not be reliably obtained. Accordingly, other methods demonstrated below were used to demonstrate the corrosion resistance effect of the AEM when paired with metallic anodes.

Examples 24 and 25

Figure 9:
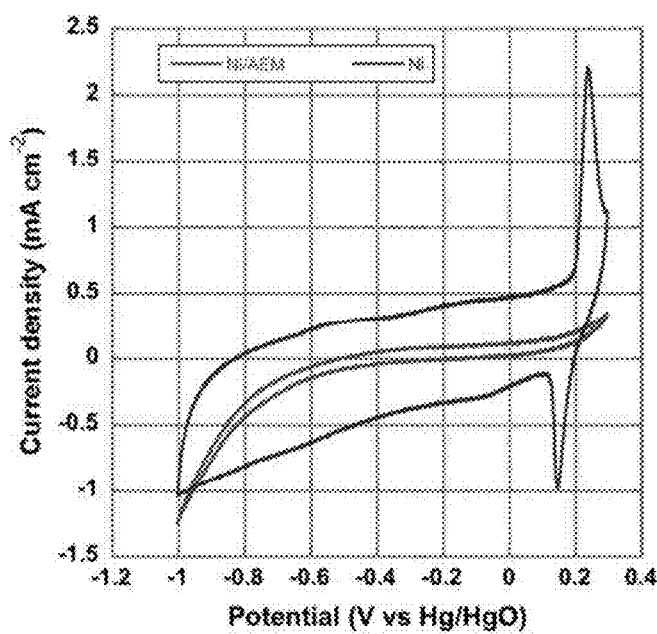
FIG. 9 is a cyclic voltammogram of Ni and Ni:AEM electrodes corresponding to Example 24.

In Example 24, cyclic voltammetry was conducted on a comparison Nickel (Ni) foil (working electrode) and AEM:Ni foil assembly in 30% KOH versus a platinum counter. See FIG. 9 which shows a cyclic voltammogram of Ni foil (wider loop with peak at about 0.2 V) and AEM:Ni foil assembly (narrower loop with no significant peaks) at 20 mV s$^{-1}$ scan rate. In the case of nickel foil, the oxidation/reduction for Ni$^{2+}$/Ni$^{3+}$ was observed after repetitive cycling in electrolyte (only one later scan is shown). When the AEM was placed in between the electrolyte and the Ni foil, there was a decrease in capacitive charging at the nickel surface and an obvious lack of oxidation/reduction occurring (again only one later scan is shown). This is consistent with a lower effective concentration of hydroxide at the nickel electrode surface.

Figure 10:
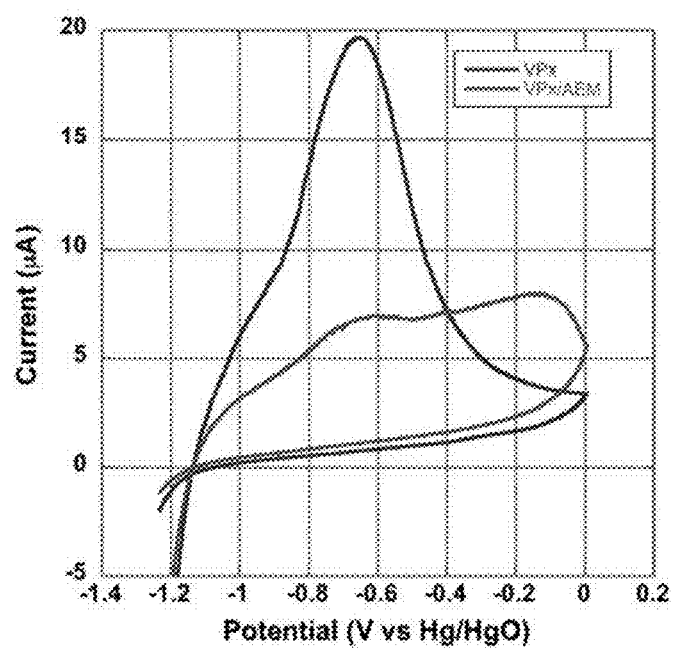
FIG. 10 is a cyclic voltammogram of $VP_x$ and $VP_x$:AEM electrodes corresponding to Example 25.

In Example 25, cyclic voltammetry was conducted on VP$_x$ and AEM:VP$_x$ example electrodes. The loop with the highest peak at about −0.7 V corresponds to the VP$_x$ electrode, and the other loop corresponds to VP$_x$:AEM electrode assembly. As shown in FIG. 10, there was a decrease in current and broadening for the VP$_x$ oxidation peak with AEM:VP$_x$, which is indicative of lower hydroxide availability near the electrode surface. The first half scan was performed in the positive direction starting at OCV. These scans were performed at a 0.05 mV s$^{-1}$ scan rate to allow time for the oxidation of VP$_x$ to occur.

In general, the lack of reduction peak on the return scan, also demonstrates that VP$_x$ is an electrochemically irreversible system applicable to primary battery systems.

It is claimed:

1. An electrode, comprising of:
a vanadium phosphorous alloy;
an ionomeric barrier coupled to the vanadium phosphorous alloy;
wherein the ionomer of the ionomeric barrier comprises a polymer with attached cationic functional groups; and
wherein the polymer base of the ionomeric barrier is selected from the group consisting of poly(phenylene), poly(sulfone), poly(ethylene), poly(arylene ether), poly (ether ether ketone), poly(styrene), or polymers with perfluorinated backbones.

2. The electrode of claim 1, wherein the vanadium phosphorous alloy is a vanadium phosphide.

3. The electrode of claim 1, wherein the cationic functional group is selected from: quaternary ammonium, phosphonium, sulfonium, complexed metal cations, and resonance-stabilized cations, pyridinium, imidazolium, and guanidinium.

4. The electrode of claim 1, wherein the ionomeric barrier has a hydroxide conductivity of 20 to 100 mS cm$^{-1}$.

5. An apparatus comprising:
an electrochemical half-cell comprising:
an electrolyte; and an
an anode comprising:
a vanadium phosphorous alloy;
an ionomeric barrier coupled to the vanadium phosphorous alloy;
wherein the ionomer of the ionomeric barrier comprises a polymer with attached cationic functional groups; and
wherein the polymer base of the ionomeric barrier is selected from the group consisting of poly(phenylene), poly(sulfone), poly(ethylene), poly(arylene ether), poly(ether ether ketone), poly(styrene), or polymers with perfluorinated backbones; and
wherein the ionomeric barrier is positioned between the electrolyte and the anode.

6. The apparatus of claim 5, wherein the cationic functional group is selected from a group consisting of quaternary ammonium, phosphonium, sulfonium, complexed metal cations, and resonance-stabilized cations, pyridinium, imidazolium, and guanidinium.

7. The apparatus of claim 5, wherein the apparatus is a battery.

8. The apparatus of claim 5, further comprising an air cathode.

9. The apparatus of claim 5, wherein the ionomeric barrier is coupled to the anode.

10. The apparatus of claim 5, wherein the apparatus further comprises a separator and a cathode, the separator positioned between the anode and the cathode.

11. The apparatus of claim 5, wherein the electrolyte comprises an aqueous solution.

12. The apparatus of claim 5, wherein the ionomeric barrier has a hydroxide conductivity of 20 to 100 mS cm$^{-1}$.

* * * * *